(12) United States Patent
Fukushima et al.

(10) Patent No.: US 11,323,057 B2
(45) Date of Patent: May 3, 2022

(54) INVERTER AND CONTROL SYSTEM (71) Applicant: OMRON Corporation, Kyoto (JP)

(72) Inventors: Masanori Fukushima, Kusatsu (JP); Ryoichi Watanabe, Otsu (JP); Hiroyuki Tateyama, Otsu (JP)

(73) Assignee: OMRON CORPORATION, Kyoto (JP)

( * ) Notice: Subject to any disclaimer, the term of this patent is extended or adjusted under 35 U.S.C. 154(b) by 202 days.

(21) Appl. No.: 16/642,443

(22) PCT Filed: Oct. 29, 2018

(86) PCT No.: PCT/JP2018/040158
§ 371 (c)(1),
(2) Date: Feb. 27, 2020

(87) PCT Pub. No.: WO2019/088036
PCT Pub. Date: May 9, 2019

(65) Prior Publication Data
US 2020/0252019 A1 Aug. 6, 2020

(30) Foreign Application Priority Data
Nov. 2, 2017 (JP) .............................. JP2017-213053

(51) Int. Cl.
*H02P 27/06* (2006.01)
*H02J 9/00* (2006.01)
(Continued)

(52) U.S. Cl.
CPC .............. *H02P 27/06* (2013.01); *H02J 9/005* (2013.01); *H02M 7/493* (2013.01); *H02M 1/0032* (2021.05)

(58) Field of Classification Search
CPC ...... H02P 1/00; H02P 1/04; H02P 1/12; H02P 1/163; H02P 1/18; H02P 1/24; H02P 1/26;
(Continued)

(56) References Cited

U.S. PATENT DOCUMENTS

| 8,816,631 | B2 * | 8/2014 | Wei | .......................... | H02M 1/36 |
| | | | | | 318/722 |
| 2013/0241451 | A1 * | 9/2013 | Wei | ........................ | H02M 7/125 |
| | | | | | 318/400.3 |

FOREIGN PATENT DOCUMENTS

| DE | 102013202405 A1 | 8/2014 |
| EP | 2816428 A1 | 12/2014 |

(Continued)

OTHER PUBLICATIONS

Ye Ping et al. "Fault-Tolerant Control System for Joint Module of Light Weight Space Robotic System", IEEE International Symposium on Industrial Electronics (ISIE 2009), Jul. 5, 2009, pp. 384-389, IEEE, Piscataway, NJ, USA.
The extended European search report (EESR) dated Jul. 16, 2021 in a counterpart European patent application.
An English translation of the International Search Report("ISR") of PCT/JP2018/040158 dated Dec. 11, 2018.
(Continued)

*Primary Examiner* — Antony M Paul
(74) *Attorney, Agent, or Firm* — Metrolex IP Law Group, PLLC (57) ABSTRACT

The present invention reduces electric power consumption of a network inverter. The inverter (1a, 1b, 1c) includes: an MPU (20a, 20b, 20c); and a power supply (10) configured to carry out electric power delivery to the MPU (20a, 20b, 20c) and to a power source circuit (40). In a case where the inverter (1a, 1b, 1c) is to enter a standby state, an electric power delivery control circuit (22) of the MPU (20a, 20b, 20c) blocks electric power delivery to the power source circuit (40).

13 Claims, 5 Drawing Sheets

(51) Int. Cl.
*H02M 7/493* (2007.01)
*H02M 1/00* (2006.01)

(58) Field of Classification Search
CPC .... H02P 1/265; H02P 1/28; H02P 1/30; H02P 1/42; H02P 1/46; H02P 3/00; H02P 5/00; H02P 6/00; H02P 6/005; H02P 6/28; H02P 7/00; H02P 7/292; H02P 9/00; H02P 9/302; H02P 21/00; H02P 21/22; H02P 21/34; H02P 23/00; H02P 23/07; H02P 23/20; H02P 27/00; H02P 27/04; H02P 27/06; H02P 27/048; H02P 2207/05; H02M 7/493; H02M 2001/0032

See application file for complete search history.

(56) References Cited

FOREIGN PATENT DOCUMENTS

| JP | 2000-286064 A | 10/2000 |
|---|---|---|
| JP | 2000-308338 A | 11/2000 |
| JP | 2012-34556 A | 2/2012 |
| JP | 2017-139938 A | 8/2017 |

OTHER PUBLICATIONS

The Written Opinion of the International Searching Authority ("WO-ISA") of PCT/JP2018/040158 dated Dec. 11, 2018.
The Written Opinion of the International Preliminary Examining Authority ("WO-IPEA") of PCT/JP2018/040158 dated Nov. 26, 2019.

* cited by examiner

INVERTER AND CONTROL SYSTEM

TECHNICAL FIELD

The present invention relates to an inverter and the like which communicates with a master device via a network.

BACKGROUND ART

Conventionally, various inverters for controlling the rotation speeds of motors have been developed. A conventional inverter is a standalone device which is driven by a user only during a period in which a motor needs to be controlled.

Figure 5:
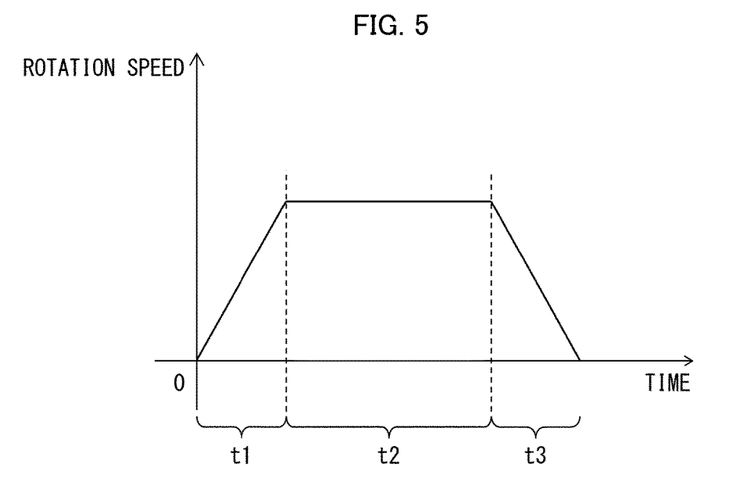
FIG. 5 is a view illustrating a change in rotation speed of a motor from a start to a stop of an operation of the motor at a constant speed.

FIG. 5 is a view illustrating a change in rotation speed of a motor from a start to a stop of an operation of the motor at a constant speed. In a case where the motor is operated at a constant speed, an inverter controls the number of rotations of the motor so that the number of rotations of the motor gradually increases after driving is started (period t1). At a time point at which the number of rotations reaches a maximum value, the motor enters a constant speed operation state in which to continue rotating at a maximum rotation speed (period t2). During the period t2, it is unnecessary to control the rotation speed of the motor. Therefore, a user turns off a power supply of the inverter and connects the motor directly to a commercial power supply for an operation at the constant speed. This is to stop electric power consumption which is caused by driving the inverter during the operation at the constant speed. In a case where the motor is to be stopped by ending the constant speed operation, the inverter controls the number of rotations of the motor so that the number of rotations gradually decreases until the motor stops (period t3).

Figure 6:
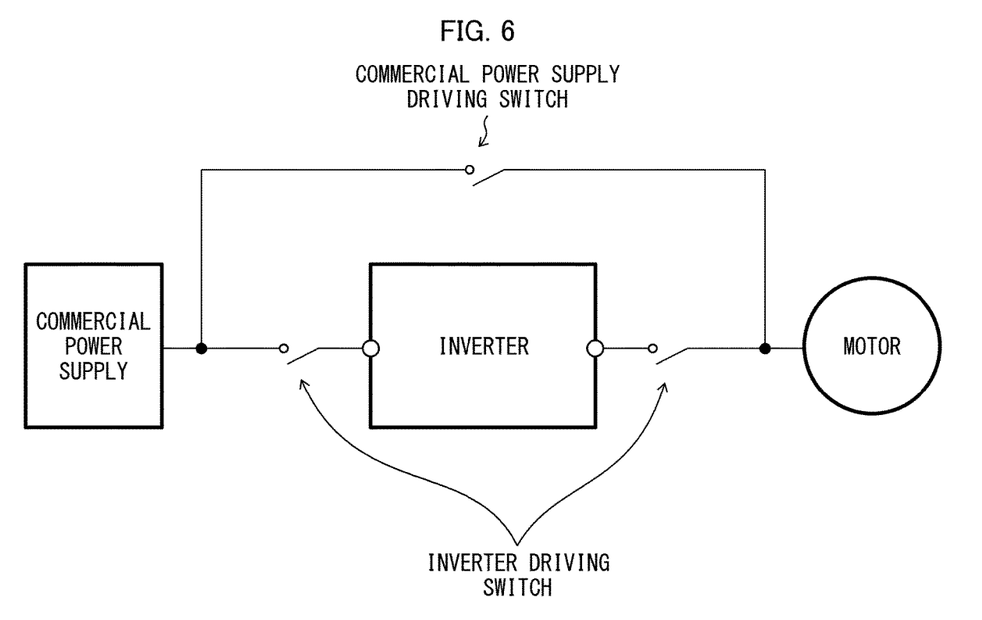
FIG. 6 is a diagram illustrating a circuit in which a power supply of an inverter can be turned off while the motor is rotating.

FIG. 6 is a diagram illustrating a circuit in which a power supply of an inverter can be turned off while the motor is rotating. A commercial power supply and the motor are connected via the inverter or connected directly without the use of the inverter. As illustrated in FIG. 6, at both ends of the inverter, inverter driving switches are provided. In addition, a commercial power supply driving switch is provided in a path in which the commercial power supply and the motor are directly connected.

According to the circuit illustrated in FIG. 6, the motor can be controlled with use of the inverter by turning on the inverter driving switch and turning off the commercial power supply driving switch. On the other hand, by turning off the inverter driving switch and turning on the commercial power supply driving switch, it is possible to directly connect the commercial power supply and the motor so as to cause the motor to operate at a constant speed. By thus configuring the circuit illustrated in FIG. 6, for example, the power supply of the inverter can be turned on and off as described above with reference to FIG. 5.

As described above, various circuits for turning on and off power supplies have been developed. For example, Patent Literature 1 discloses a switching power supply device for reducing electric power loss during standby.

CITATION LIST

Patent Literature

[Patent Literature 1] Japanese Patent Application Publication Tokukai No. 2000-308338 (Publication date: Nov. 2, 2000)

SUMMARY OF INVENTION

Technical Problem

Meanwhile, in addition to standalone inverters, network inverters have also been developed. A network inverter is connected to and communicates with a master device via a network. However, the power supply of the network inverter cannot be turned off even in a case where it is unnecessary to control a motor. This is because, in a case where the power supply of the network inverter is turned off while the network inverter is connected to the network, there is a possibility that the master device (with which the network inverter communicates) or the entire network may be adversely affected. For example, assume that a network inverter is connected to EtherCAT (registered trademark). In this case, turning off the power supply of the network inverter causes a communication line of EtherCAT to be blocked. This poses a risk of stopping the entire network.

According to network inverters, therefore, it is difficult to suppress electric power consumption by a method used for standalone inverters such as that described above. However, users have high demands for reduction in electric power consumption of network inverters.

The present invention has been made in view of the above problem of network inverters, and an object of the present invention is to reduce electric power consumption of network inverters.

Solution to Problem

In order to attain the object, the present invention employs configurations below.

That is, an invention in accordance with an aspect of the present invention is an inverter which includes a power source circuit configured to carry out electric power delivery to a control target device and which carries out communication with a master device via a network, the inverter including: a processor including a communication circuit configured to carry out the communication and an electric power delivery control circuit configured to control electric power delivery to the power source circuit; and a power supply configured to carry out electric power delivery to the processor and to the power source circuit, the electric power delivery control circuit being configured to block the electric power delivery to the power source circuit in a case where the inverter is to enter a standby state.

A control system in accordance with an aspect of the present invention includes: one or more of the inverter; and the master device configured to carry out communication with each of the one or more of the inverter.

Advantageous Effects of Invention

With an aspect of the present invention, it is possible to reduce electric power consumption of a network inverter.

DESCRIPTION OF EMBODIMENTS

Embodiment 1

§ 1 Application Example

Figure 1:
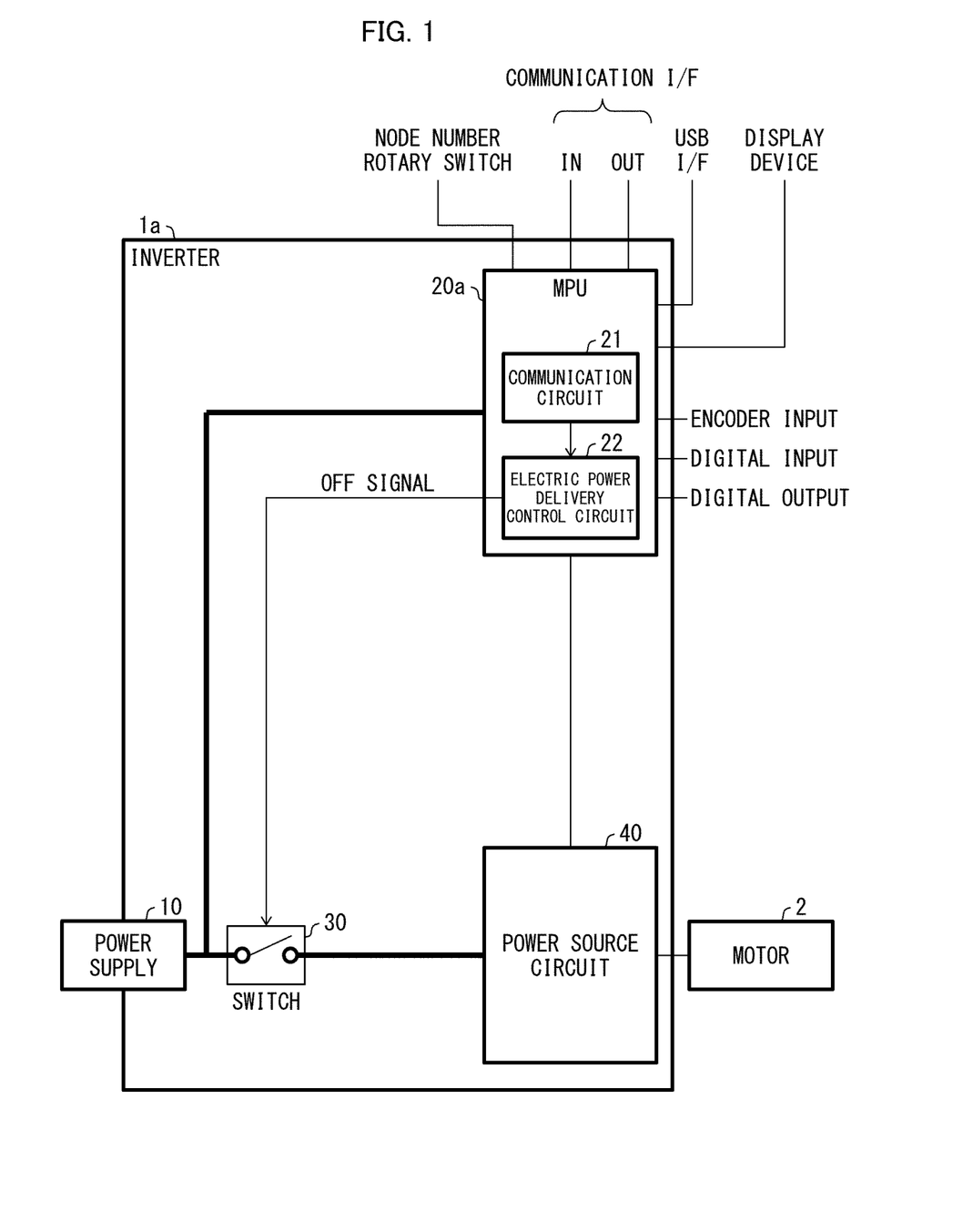
FIG. 1 is a circuit diagram illustrating a configuration of main parts of an inverter in accordance with Embodiment 1 of the present invention.

The following description will discuss, with reference to the drawings, an embodiment in accordance with an aspect of the present invention. First, an example of an inverter to which the present invention is applied will be described with reference to FIG. 1. FIG. 1 is a circuit diagram illustrating a configuration of main parts of an inverter $1a$ in accordance with Embodiment 1. FIG. 1 also illustrates a motor 2 which is a control target device to be controlled by the inverter $1a$.

The inverter $1a$ is a network inverter which (i) includes a power source circuit 40 configured to carry out electric power delivery to the motor 2 that is a control target device and (ii) communicates with a master device via a network. Communication between the inverter $1a$ and the master device will be described later in detail.

As illustrated in FIG. 1, the inverter $1a$ includes: the power source circuit 40; a micro-processor unit (MPU) $20a$; a power supply 10 for carrying out electric power delivery to the MPU $20a$ and to the power source circuit 40; and a switch 30. The power supply 10 is connected directly to the MPU $20a$ and is connected to the power source circuit 40 via the switch 30. The power source circuit 40 is connected to the motor 2 which is a target to be controlled by the inverter $1a$.

The MPU $20a$ includes: a communication circuit 21 which communicates with the master device; and an electric power delivery control circuit 22 which controls electric power delivery to the power source circuit 40. In a case where the inverter is caused to enter a standby state, the electric power delivery control circuit 22 controls the switch 30 to disconnect the power supply 10 and the power source circuit 40, so that electric power delivery to the power source circuit 40 is blocked. Note that the "standby state" means a state in which the inverter does not control the motor which is connected to the inverter.

§ 2 Configuration Example

An example of a configuration of the inverter $1a$ will be described in more detail next. The power supply 10 carries out electric power delivery to the MPU $20a$ and to the power source circuit 40 of the inverter $1a$. The power supply 10 can be a device, such as an electric generator, which generates electric power independently. Alternatively, the power supply 10 can draw electric power from an external power supply into the inverter $1a$. Alternatively, the power supply 10 can be a power supply which is external to the inverter $1a$.

The communication circuit 21 of the MPU $20a$ performs control concerning communication of the inverter $1a$. The electric power delivery control circuit 22 of the MPU$20a$ performs control concerning electric power delivery to the inverter $1a$. To the MPU $20a$, a node number rotary switch for specifying a node for use in communication with the master device is connected. The MPU $20a$ is also provided with an input/output interface serving as a communication interface (I/F) with the master device.

The MPU $20a$ can be provided with a USB I/F to/from which a USB memory or the like can be attached and detached. To the MPU$20a$, a display device can also be connected, the display device being configured to display, for example, (i) an operation status of the inverter $1a$, (ii) an error code at the time of the occurrence of an error, and (ii) a status of controlling of the motor carried out by the inverter $1a$.

The communication circuit 21 communicates with the master device. The communication circuit 21 connects to the network via the communication I/F at a node specified by the node number rotary switch. In a case where the communication circuit 21 receives from the master device an instruction (standby command) to cause the inverter $1a$ to enter a standby state, the communication circuit 21 notifies the electric power delivery control circuit 22 of the standby command.

By turning the switch 30 on and off, the electric power delivery control circuit 22 controls delivery of electric power to the power source circuit 40. In a case where the electric power delivery control circuit 22 is notified by the communication circuit 21 that the standby command has been received, the electric power delivery control circuit 22 causes the inverter $1a$ to enter the standby state. Specifically, to the switch 30, the electric power delivery control circuit 22 sends a signal (an off signal) indicating that the switch 30 is to be turned off.

The switch 30 is a switch for switching between connection and disconnection between the power supply 10 and the power source circuit 40. In a case where the entire inverter $1a$ is driven, the switch 30 is in an on state. The switch 30 can be a switching element such as a transistor, or can be a physical switch.

In a case where the switch 30 is a switching element, receiving an off signal from the electric power delivery control circuit 22 causes the switch 30 itself to enter an off state. In a case where the switch 30 is a physical switch, the electric power delivery control circuit 22 turns off the switch 30 directly instead of sending an off signal to the switch 30. This disconnects the power supply 10 and the power source circuit 40 from each other, and therefore blocks electric power delivery from the power supply 10 to the power source circuit 40.

The MPU $20a$ can further include (i) an encoder input terminal into which information (e.g., encoder pulse) is to be inputted from an encoder, (ii) a digital input terminal into which a control command or various information is to be inputted from an external device, and (iii) a digital output terminal from which information (status information) indicating the status of the inverter $1a$ is to be supplied to an external device.

The MPU $20a$ can further include a circuit (feedback control circuit) for realizing a function (feedback function) of (i) obtaining information concerning results of outputs from the power source circuit 40 and (ii) performing feedback control on the power source circuit 40 according to the information.

For example, the MPU $20a$ can obtain pulses of output voltage to the motor via an encoder input terminal. Then, the MPU $20a$ can count the pulses (encoder pulses) thus obtained, so as to calculate a rotation speed of the motor 2, based on a count value. By transmitting the rotation speed to the power source circuit 40, the MPU 20a can cause the power source circuit 40 to perform feedback control on (i) a frequency of an output current from the power source circuit 40 and (ii) a pulse width of the output voltage of the power source circuit 40.

Via the digital input terminal, the MPU 20a can obtain (i.e., digital input) a moving amount of a machine (such as a belt conveyor) using the motor 2 as a motive force. Then, it is possible to count the moving amount so as to calculate, based on a count value, a current location of the machine. By transmitting the count value of the moving amount or the calculated current location to the power source circuit 40, the MPU 20a can cause the power source circuit 40 to perform feedback control on (i) a frequency of an output current from the power source circuit 40 and (ii) a pulse width of output voltage of the power source circuit 40 (latch control).

The power source circuit 40 is a circuit for regulating (i) a frequency of an output current and (ii) a pulse width of output voltage. Because the power source circuit 40 regulates the frequency of the output current, the inverter 1a can control at least one of the number of rotations per unit time (i.e., rotation speed) of the motor and a torque of the motor. A conventional method can be used for a method in which the power source circuit 40 regulates (i) the frequency of the output current and (ii) the pulse width of the output voltage. For example, the power source circuit 40 includes an insulated gate bipolar transistor (IGBT) so as to perform electric current control and velocity control to achieve vector control or V/f control of the inverter 1a.

Note that the power source circuit 40 can perform feedback control on the frequency of the output current and the pulse width of the output voltage, according to values, such as the count value or the current location, received from the MPU20a.

Note that it is unnecessary to control the motor 2. Therefore, in a case where the inverter 1a is caused to enter a standby state, it is unnecessary to drive the power source circuit 40. Assume here that the inverter 1a is caused to enter a standby state, that is, a case where it is unnecessary to drive the power source circuit 40. In this case, with the configuration illustrated in FIG. 1, it is possible to stop the power source circuit 40 while allowing the MPU 20a including the communication circuit 21 to be driven. This makes it possible to reduce electric power consumption of the inverter while preventing the communication circuit 21 from stalling which adversely affects the network.

§ 3 Configuration Example of Network

Figure 2:
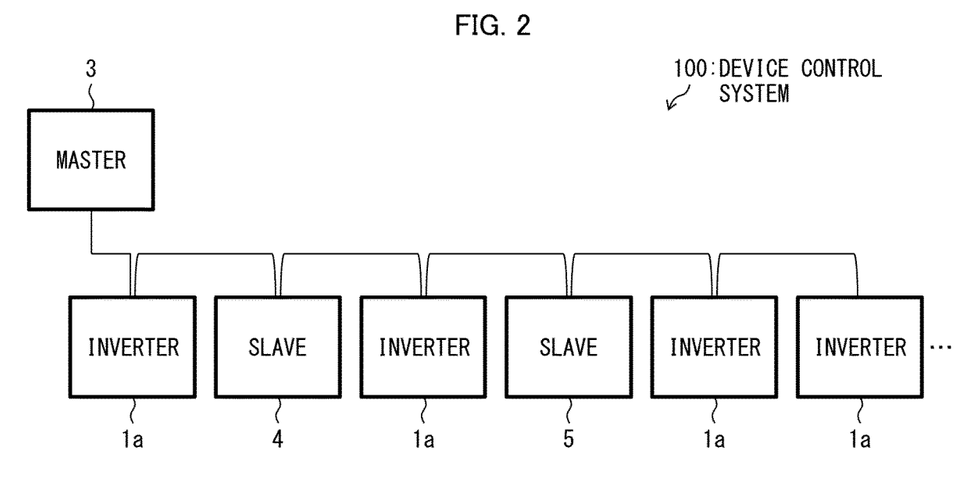
FIG. 2 is a view illustrating a control system including the inverter.

FIG. 2 is a view illustrating a device control system (control system) 100 including inverters 1a. The device control system 100 includes at least: one or more inverters 1a; and a master 3 which is a master device of the inverters 1a. The device control system 100 can further include slaves 4 and 5.

The master 3, the inverters 1a, and the slaves 4 and 5 are connected via a network such as EtherCAT (registered trademark). There is no particular limitation as to an order in which the inverters 1a and the slaves 4 and 5 are connected.

The master 3 is a device for transmitting a control command to the inverters 1a. According to Embodiment 1, the master 3 transmits a standby command to the inverters 1a. The master 3 can receive, from each of the inverters 1a, (i) the status of the inverter 1a and (ii) the result of the inverter 1a controlling a corresponding motor 2.

Assume that the device control system 100 employs a network of EtherCAT (registered trademark). In this case, each of the devices included in the device control system 100 is configured to (i) receive a data block which is circulating in a communication network of a field network of EtherCAT (hereinafter simply referred to as "communication network") and (ii) return the data block to the communication network such that various data is contained in the data block. This causes data to be transmitted and received indirectly. Note that "data block" refers to a collection of data which circulates (exchanged periodically) among various devices connected to a communication network. The cycles of the circulations of the data block are determined according to a cycle time of each device included in the device control system 100.

Embodiment 2

The following description will discuss Embodiment 2 of the present invention. In each of the embodiments discussed below, for convenience, members which are identical in function to the members described in Embodiment 1 are given respective identical reference signs, and descriptions of those members are not repeated.

Figure 3:
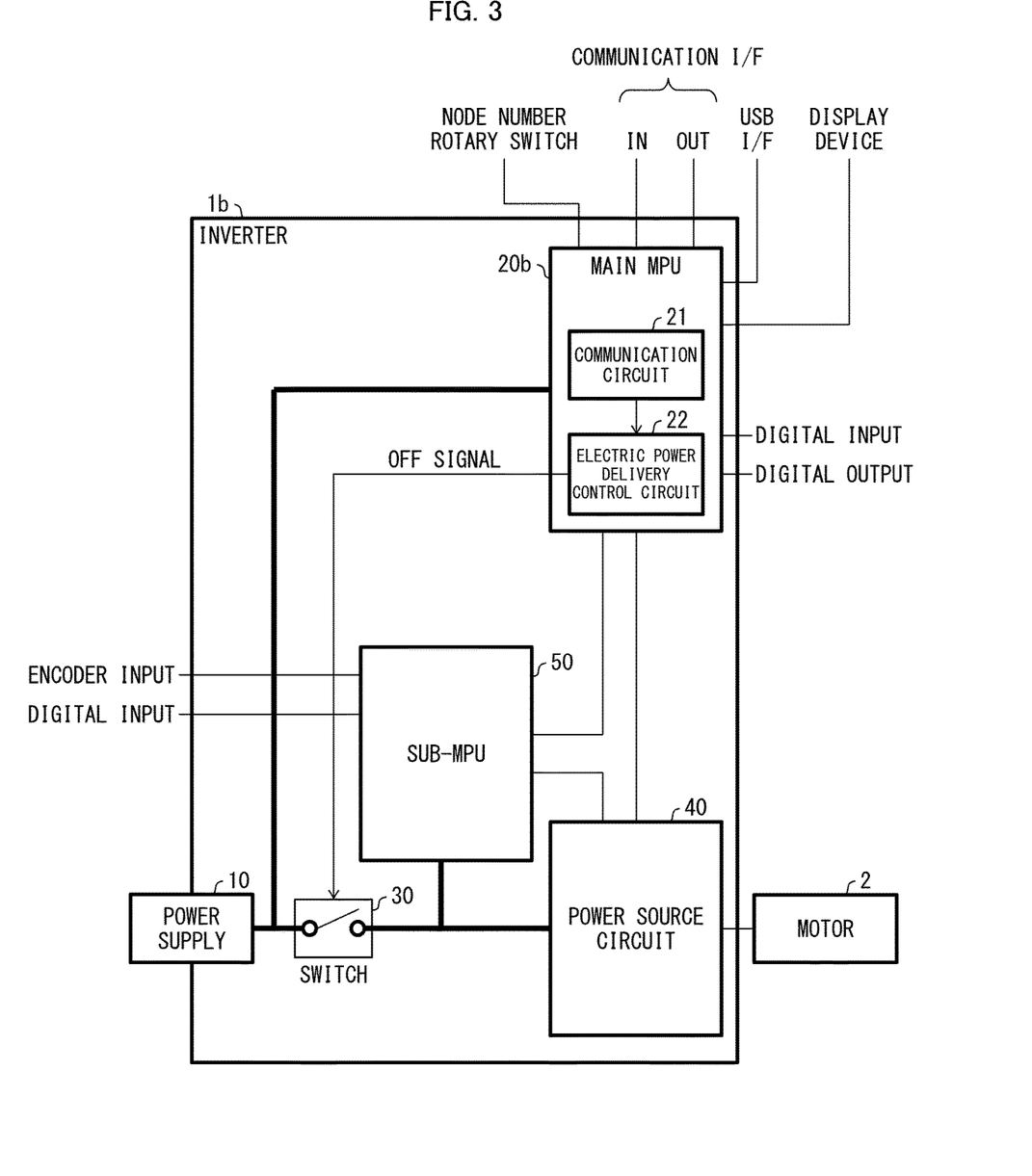
FIG. 3 is a circuit diagram illustrating a configuration of main parts of an inverter in accordance with Embodiment 2 of the present invention.

FIG. 3 is a circuit diagram illustrating a configuration of main parts of an inverter 1b in accordance with Embodiment 2. The inverter 1b differs from the inverter 1a illustrated in FIG. 1 in that part of the functions of the MPU 20a in FIG. 1 is distributed to a sub-MPU 50. The sub-MPU 50 is connected to a power supply 10 via a switch 30.

A configuration of a main MPU 20b is identical to that of the MPU 20a illustrated in FIG. 1 except that the main MPU 20b includes no feedback control circuit. The main MPU 20b can include a digital input terminal and a digital output terminal.

On the other hand, the sub-MPU 50 includes a feedback control circuit so as to perform various processes involved in a feedback function. The sub-MPU 50 includes an encoder input terminal and a digital input terminal.

Specifically, the sub-MPU 50 counts encoder pulses. Furthermore, the sub-MPU 50 calculates a rotation speed of a motor 2 based on the count value, and then transmits the value of the rotation speed to a power source circuit 40. According to the value of the rotation speed received from the sub-MPU 50, the power source circuit 40 regulates (i) a frequency of an output current and (ii) a pulse width of output voltage. The sub-MPU 50 also counts a moving amount of a machine (and calculates a current location of the machine from the moving amount). According to the count value of the moving amount or the current location received from the sub-MPU 50, the power source circuit 40 regulates (i) a frequency of an output current and (ii) a pulse width of output voltage.

The sub-MPU 50 can transmit, to the main MPU 20b, the rotation speed of the motor 2 and the count value of the moving amount (or current location). Then, the main MPU 20b can transmit these pieces of information to the master 3 (which is master device) via the digital output terminal. Alternatively, the main MPU 20b can cause the display device to display these pieces of information.

According to Embodiment 2, as in Embodiment 1, in a case where a communication circuit 21 receives a standby command, an electric power delivery control circuit 22 switches the status of the switch 30 to a disconnected state. As illustrated in FIG. 3, the disconnection of the switch 30 blocks not only electric power delivery to the power source circuit 40 but also electric power delivery to the sub-MPU 50.

In a case where the inverter 1b is caused to enter a standby state, the power source circuit 40 stops. This makes it unnecessary to drive the feedback control circuit included in the sub-MPU 50. With the above configuration, therefore, it is possible to stop the sub-MPU 50 in a case where it is unnecessary to drive the sub-MPU 50. This makes it possible to reduce electric power consumption of the inverter 1b.

Embodiment 3

Figure 4:
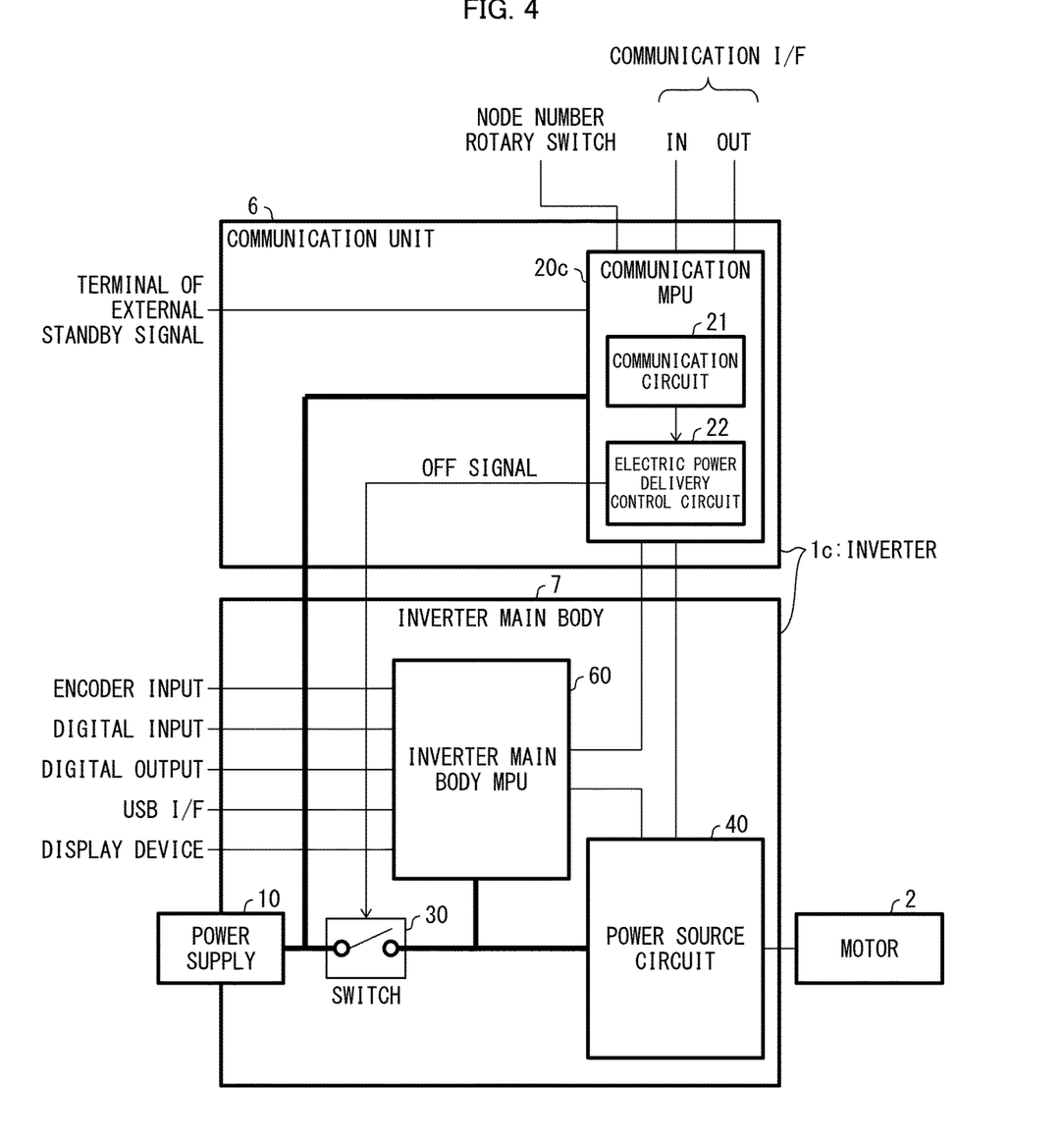
FIG. 4 is a circuit diagram illustrating a configuration of main parts of an inverter in accordance with Embodiment 3 of the present invention.

The following description will discuss Embodiment 3 of the present invention. FIG. 4 is a circuit diagram illustrating a configuration of main parts of an inverter 1c in accordance with Embodiment 3. An inverter 1c differs from the inverter 1a illustrated in FIG. 1 and from the inverter 1b illustrated in FIG. 2 in that a communication MPU 20c, which includes the communication circuit 21 and the electric power delivery control circuit 22 of the inverter 1a illustrated in FIG. 1, is separated as a communication unit 6 from an inverter main body MPU 60 of an inverter main body (main body unit) 7.

The communication MPU 20c converts a communication with a master 3 into a communication frame which can be interpreted by the inverter main body 7, and then transmits the communication frame to the inverter main body MPU 60. The communication MPU 20c converts various information received from the inverter main body MPU 60 into a form in which the information can be transmitted to the master 3, and transmits the information in the converted form to the master 3.

The communication MPU 20c includes the communication circuit 21 and the electric power delivery control circuit 22. The functions of these circuits are similar to those of the MPU 20a of the inverter 1a and the main MPU 20b of the inverter 1b. The communication MPU 20c can further include a dedicated input terminal (terminal of the external standby signal) for receiving a standby command from an external device or from the master 3.

The inverter main body MPU 60 serves all of functions of the MPU20a except for those of the communication MPU 20c. The inverter main body MPU 60 includes a feedback control circuit so as to perform a process involved in a feedback function. As illustrated in FIG. 4, the inverter main body MPU 60 is connected to a power supply 10 via a switch 30. The inverter main body MPU 60 includes an encoder input terminal, a digital input terminal, and a digital output terminal. The inverter main body MPU 60 can also include a USB I/F. The inverter main body MPU 60 can also be connected to a display device.

According to Embodiment 3, as in Embodiments 1 and 2, in a case where the communication circuit 21 receives a standby command, the electric power delivery control circuit 22 turns the switch 30 so that the power supply 10 and the power source circuit 40 are disconnected from each other. As illustrated in FIG. 4, the disconnection of the switch 30 blocks not only electric power delivery to the power source circuit 40 but also electric power delivery to the inverter main body MPU 60.

In a case where the inverter 1c is caused to enter a standby state, the power source circuit 40 stops. This makes it unnecessary to drive the feedback control circuit included in the inverter main body MPU 60. With the above configuration, therefore, it is possible to stop the inverter main body MPU 60 in a case where it is unnecessary to drive the inverter main body MPU 60. This makes it possible to further reduce electric power consumption of the inverter 1c.

With the above-described configuration, it is possible to physically separate the communication circuit 21 and the electric power delivery control circuit 22 from the main functions of an inverter, which are performed by the power source circuit 40 and by the feedback control circuit of the inverter main body MPU 60. This allows various communication units 6 and various inverter main bodies 7 to be used in combination. For example, assume that the communication unit 6 and the inverter main body 7 are units manufactured by different manufacturers. Even in this case, if these units are configured as described above and can be connected to each other, these units can be combined to achieve the present invention. In addition, for example, the communication unit 6 can be used in combination with a device unit other than an inverter (e.g., an industrial servodriver). This improves versatility of invention.

[Variations]

Note that the communication circuit 21 can receive, from the master 3, a restart command which is an instruction to restart any one of the inverters 1a through 1c. It is possible that in a case where the communication circuit 21 receives the restart command, the electric power delivery control circuit 22 turns on the switch 30 so as to connect the power supply 10 and the power source circuit 40. This resumes electric power delivery from the power supply 10 to the power source circuit 40.

With this configuration, in a case where the power source circuit 40 is to be restarted, it is possible to receive the restart command from the master 3 via the communication circuit 21, to which electric power is being supplied. Then, the power source circuit 40 can be restarted in accordance with the restart command. With the configuration, therefore, it is possible to restart the power source circuit 40 without providing a separate user interface for instructing any one of the inverters 1a through 1c to restart the power source circuit 40.

Note that the communication circuit 21 of any one of the inverters 1a through 1c can receive, from the master 3, a driving command which is an instruction to drive (i) any one of the inverters 1a through 1c or (ii) the motor 2. Then, in a case where the communication circuit 21 has not received the driving command for a certain period of time, the electric power delivery control circuit 22 can turn the switch 30 so as to block electric power delivery to the power source circuit 40. Therefore, in a case where the driving command has not been received for a certain period of time, any one of the inverters 1a through 1c can enter a standby state. This makes it possible to further reduce electric power consumption of the inverter.

The driving command can include information which indicates a frequency of an output current supplied to the motor 2. It is then possible that in a case where the frequency of the output current indicated by the driving command is 0, the electric power delivery control circuit 22 turns the switch 30 so as to block electric power delivery to the power source circuit 40. With this configuration, it is possible to cause any one of the inverters 1a through 1c to enter a standby state in a case where, although a driving command is received, the frequency of the output current to the motor 2 is 0, that is, no electric current is supplied to the motor 2. This makes it possible to further reduce electric power consumption of any one of the inverters 1a through 1c.

The present invention is not limited to the embodiments, but can be altered by a skilled person in the art within the scope of the claims. The present invention also encompasses, in its technical scope, any embodiment derived by combining technical means disclosed in differing embodiments.

The embodiments discussed above are merely illustrative of the present invention in all respects. It is understood that various modifications and variations can be made, provided that the scope of the present invention is not exceeded. In other words, in working of the present invention, any specific configurations corresponding to the embodiments can be adopted as appropriate. Note that natural language is used to describe the data appearing in the embodiments. However, the data is, more specifically, specified by any of pseudo-language, commands, parameters, machine language, and the like, each of which can be recognized by computer.

Note that instead of receiving a standby command from the master 3, any one of the inverters 1a through 1c discussed in the embodiments above can be configured as follows: That is, in a case where a user operates a physical switch or the like provided to the main body of any one of the inverters 1a through 1c, any one of the inverters 1a through 1c enters a standby state.

As has been described, an invention in accordance with an aspect of the present invention is an inverter which includes a power source circuit configured to carry out electric power delivery to a control target device and which carries out communication with a master device via a network, the inverter including: a processor including a communication circuit configured to carry out the communication and an electric power delivery control circuit configured to control electric power delivery to the power source circuit; and a power supply configured to carry out electric power delivery to the processor and to the power source circuit, the electric power delivery control circuit being configured to block the electric power delivery to the power source circuit in a case where the inverter is to enter a standby state.

Note that the "standby state" means a state in which the inverter does not control the motor which is connected to the inverter. Therefore, in a case where the inverter is to enter a standby state, it is unnecessary to drive the power source circuit. Assume here that the inverter is to enter the standby state, that is, a case where it is unnecessary to drive the power source circuit. In this case, with the configuration above, it is possible to stop the power source circuit while allowing the processor including the communication circuit to be driven.

This makes it possible to reduce electric power consumption of the inverter while preventing the communication circuit from stalling which adversely affects the network. With the configuration, therefore, it is possible to reduce electric power consumption of the network inverter.

The inverter can be configured so that the communication circuit is configured to receive, from the master device, a standby command which is an instruction for causing the inverter to enter the standby state; and in a case where the communication circuit has received the standby command, the electric power delivery control circuit blocks the electric power delivery to the power source circuit.

With the configuration, a standby command can be received from the master device via the network. Therefore, even in a case where a user interface (e.g., physical switch) for putting the inverter in standby is not provided in the inverter, it is still possible to specify a case where the inverter is to enter a standby state.

The inverter can be configured so that: the communication circuit of the inverter is configured to receive, from the master device, a restart command which is an instruction for restarting the inverter; and in a case where the communication circuit has received the restart command, the electric power delivery control circuit resumes the electric power delivery to the power source circuit.

With this configuration, in a case where the power source circuit is to be restarted, it is possible to receive the restart command from the master device via the communication circuit, to which electric power is being supplied. Then, the power source circuit can be restarted in accordance with the restart command. With the configuration, therefore, it is possible to restart the power source circuit without providing a separate user interface for instructing the inverter to restart the power source circuit.

The inverter can be configured so that: the communication circuit is configured to receive, from the master device, a driving command which is an instruction for driving the inverter or a motor connected to the inverter; and in a case where the communication circuit has not received the driving command for a certain period of time, the electric power delivery control circuit blocks the electric power delivery to the power source circuit.

With the configuration, in a case where the driving command has not been received for a certain period of time, the inverter can enter a standby state. This makes it possible to reduce electric power consumption of the inverter.

The inverter can be configured so that: the driving command contains information indicating a frequency of an output current to the motor; and in a case where the frequency indicated by the driving command is 0, the electric power delivery control circuit blocks the electric power delivery to the power source circuit.

With this configuration, it is possible to cause the inverter to enter a standby state in a case where, although a driving command is received, the frequency of the output current to the motor is 0, that is, no electric current is supplied to the motor. This makes it possible to reduce electric power consumption of the inverter.

The inverter can be configured to include a feedback control circuit which (i) obtains information concerning a result of an output from the power source circuit and (ii) carries out feedback control on the power source circuit in accordance with the information; and the electric power delivery control circuit being configured to block electric power delivery to the feedback control circuit in a case where the inverter is to enter the standby state.

In a case where the inverter is to enter a standby state, the power source circuit stops. This makes it unnecessary to drive the feedback control circuit. With the above configuration, therefore, it is possible to stop the feedback control circuit in a case where it is unnecessary to drive the feedback control circuit. This makes it possible to reduce electric power consumption of the inverter which carries out feedback control on the power source circuit.

The inverter can be configured to include: a communication unit including the processor; and a main body unit including a feedback control circuit which (i) obtains information concerning a result of an output from the power source circuit and (ii) carries out feedback control on the power source circuit in accordance with the information.

With the configuration, it is possible to physically separate the communication circuit and the electric power delivery control circuit from the main functions of the inverter, which are performed by the power source circuit and by the feedback control circuit. It is therefore possible to use the communication unit and various main body units in combination. This improves versatility of invention.

A control system in accordance with an aspect of the present invention includes: one or more of the inverter; and the master device configured to carry out communication with each of the one or more of the inverter. With the configuration, effects similar to those of the inverter can be obtained.

REFERENCE SIGNS LIST 1a, 1b, 1c Inverter
2 Motor
3 Master (master device)
4, 5 Slave
6 Communication unit
7 Inverter main body (main body unit)
10 Power supply
20a MPU (processor)
20b Main MPU (processor)
20c Communication MPU (processor)
21 Communication circuit
22 Electric power delivery control circuit
30 Switch
40 Power source circuit
50 Sub-MPU (feedback control circuit)
60 Inverter main body MPU (feedback control circuit)
100 Device control system

The invention claimed is:

1. An inverter which includes a power source circuit configured to carry out electric power delivery to a control target device and which carries out communication with a master device via a network, said inverter comprising:
a processor including
a communication circuit configured to periodically transmit, to the master device, a result of the inverter controlling the control target device and
an electric power delivery control circuit configured to control electric power delivery to the power source circuit; and
a power supply configured to carry out electric power delivery to the processor and to the power source circuit,
the electric power delivery control circuit being configured to block the electric power delivery to the power source circuit in a case where the inverter is to enter a standby state, wherein:
the communication circuit is configured to receive, from the master device, a driving command which is an instruction for driving the inverter or a motor connected to the inverter; and
in a case where the communication circuit has not received the driving command for a certain period of time, the electric power delivery control circuit blocks the electric power delivery to the power source circuit.

2. The inverter according to claim 1, wherein:
the communication circuit is configured to receive, from the master device, a standby command which is an instruction for causing the inverter to enter the standby state; and
in a case where the communication circuit has not received the standby command, the electric power delivery control circuit blocks the electric power delivery to the power source circuit.

3. The inverter according to claim 2, wherein:
the communication circuit is configured to receive, from the master device, a restart command which is an instruction for restarting the inverter; and
in a case where the communication circuit has received the restart command, the electric power delivery control circuit resumes the electric power delivery to the power source circuit.

4. The inverter according to claim 1, wherein:
the driving command contains information indicating a frequency of an output current to the motor; and
in a case where the frequency indicated by the driving command is 0, the electric power delivery control circuit blocks the electric power delivery to the power source circuit.

5. A control system comprising:
one or more of the inverter according to claim 1; and
the master device configured to carry out communication with each of the one or more of the inverter.

6. An inverter which includes a power source circuit configured to carry out electric power delivery to a control target device and which carries out communication with a master device via a network, said inverter comprising:
a processor including
a communication circuit configured to periodically transmit, to the master device, a result of the inverter controlling the control target device and
an electric power delivery control circuit configured to control electric power delivery to the power source circuit; and
a power supply configured to carry out electric power delivery to the processor and to the power source circuit,
the electric power delivery control circuit being configured to block the electric power delivery to the power source circuit in a case where the inverter is to enter a standby state, wherein:
the processor includes a feedback control circuit which (i) obtains information concerning a result of an output from the power source circuit and (ii) carries out feedback control on the power source circuit in accordance with the information; and
the electric power delivery control circuit being configured to block electric power delivery to the feedback control circuit in a case where the inverter is to enter the standby state.

7. The inverter according to claim 6, wherein:
the communication circuit is configured to receive, from the master device, a standby command which is an instruction for causing the inverter to enter the standby state; and
in a case where the communication circuit has received the standby command, the electric power delivery control circuit blocks the electric power delivery to the power source circuit.

8. The inverter according to claim 7, wherein:
the communication circuit is configured to receive, from the master device, a restart command which is an instruction for restarting the inverter; and
in a case where the communication circuit has received the restart command, the electric power delivery control circuit resumes the electric power delivery to the power source circuit.

9. A control system comprising:
one or more of the inverter according to claim 6; and
the master device configured to carry out communication with each of the one or more of the inverter.

10. An inverter which includes a power source circuit configured to carry out electric power delivery to a control target device and which carries out communication with a master device via a network, said inverter comprising:

a processor including
    a communication circuit configured to periodically transmit, to the master device, a result of the inverter controlling the control target device and
    an electric power delivery control circuit configured to control electric power delivery to the power source circuit; and
a power supply configured to carry out electric power delivery to the processor and to the power source circuit,
the electric power delivery control circuit being configured to block the electric power delivery to the power source circuit in a case where the inverter is to enter a standby state, wherein the inverter includes:
a communication unit including the processor; and
a main body unit including a feedback control circuit which (i) obtains information concerning a result of an output from the power source circuit and (ii) carries out feedback control on the power source circuit in accordance with the information.

11. The inverter according to claim 10, wherein:
the communication circuit is configured to receive, from the master device, a standby command which is an instruction for causing the inverter to enter the standby state; and
in a case where the communication circuit has received the standby command, the electric power delivery control circuit blocks the electric power delivery to the power source circuit.

12. The inverter according to claim 11, wherein:
the communication circuit is configured to receive, from the master device, a restart command which is an instruction for restarting the inverter; and
in a case where the communication circuit has received the restart command, the electric power delivery control circuit resumes the electric power delivery to the power source circuit.

13. A control system comprising:
one or more of the inverter according to claim 10; and
the master device configured to carry out communication with each of the one or more of the inverter.

\* \* \* \* \*